US007617283B2

(12) United States Patent
Aaron et al.

(10) Patent No.: US 7,617,283 B2
(45) Date of Patent: Nov. 10, 2009

(54) SYSTEM AND METHOD FOR INSTANT MESSAGING

(75) Inventors: Joseph David Aaron, Jonestown, TX (US); Guido Dante Corona, Austin, TX (US); Samuel Roy Detweiler, Cedar Park, TX (US); Randall Scott Horwitz, Austin, TX (US); Paul S. Luther, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 767 days.

(21) Appl. No.: 11/032,245

(22) Filed: Jan. 10, 2005

(65) Prior Publication Data

US 2006/0167993 A1 Jul. 27, 2006

(51) Int. Cl.
*G06F 15/16* (2006.01)
*G06F 15/173* (2006.01)
(52) U.S. Cl. .................... 709/206; 709/204; 709/207; 709/223; 709/224
(58) Field of Classification Search .............. 709/204, 709/206, 207, 223, 224
See application file for complete search history.

(56) References Cited

U.S. PATENT DOCUMENTS

| 6,539,421 | B1* | 3/2003 | Appelman et al. | 709/206 |
|---|---|---|---|---|
| 6,631,412 | B1* | 10/2003 | Glasser et al. | 709/224 |
| 6,832,245 | B1* | 12/2004 | Isaacs et al. | 709/206 |
| 7,043,530 | B2* | 5/2006 | Isaacs et al. | 709/206 |
| 2002/0143916 | A1* | 10/2002 | Mendiola et al. | 709/223 |
| 2003/0131064 | A1* | 7/2003 | Bell et al. | 709/206 |
| 2003/0217096 | A1* | 11/2003 | McKelvie et al. | 709/202 |
| 2003/0225848 | A1* | 12/2003 | Heikes et al. | 709/207 |
| 2004/0003037 | A1* | 1/2004 | Fujimoto et al. | 709/203 |
| 2004/0056901 | A1* | 3/2004 | March et al. | 345/811 |
| 2005/0066070 | A1* | 3/2005 | Klassen et al. | 710/1 |
| 2005/0080866 | A1* | 4/2005 | Kent et al. | 709/207 |
| 2005/0198131 | A1* | 9/2005 | Appelman et al. | 709/204 |
| 2006/0031366 | A1* | 2/2006 | Dolph | 709/207 |

* cited by examiner

*Primary Examiner*—Farzana Huq
(74) *Attorney, Agent, or Firm*—Libby Z. Handelsman; Jack V. Musgrove

(57) ABSTRACT

A system and method for user-defined control of the operation and appearance of a computerized instant messaging service and associated user interface is disclosed, providing ease of use, control over presentation and access to instant messaging services, particularly for unsighted and other users requiring assistive technologies. A instant messaging (IM) application includes an active sessions list (ASL) comprised of algorithmically ordered identifiers of all communicants in current active chat sessions with the user. The list is presented on the desktop and focused by a predefined first hot-key. By selecting identifiers from the list and activating a predefined second hot-key, chat windows associated with the communicants are opened and focused for receipt of responsive messages from the user.

6 Claims, 10 Drawing Sheets

SYSTEM AND METHOD FOR INSTANT MESSAGING

BACKGROUND OF THE INVENTION

1. Technical Field

The present invention relates generally to computerized information messaging systems and, more particularly, to the operation and user interface of real-time instant messaging systems.

2. Description of the Related Art

An application known generically as "instant messaging" or "IM" has become extremely popular and useful in facilitating real time text communication amongst users of computer networks such as the internet. But two examples of such IM applications are "Instant Messenger™)" offered by the America Online (AOL) internet service provider and "Sametime Connect™)" offered by the Lotus Corporation.

The basic operation of all such applications is very similar. Such an IM program will provide the user with an on-screen display of a Directory view pane 10 of other users 12, FIG. 2. The Directory is essentially a contact list predefined by the user to include the names of individuals with whom the user may desire to communicate via the IM service at a given time. In the instant example under consideration, this user will be known as "Sam", as shown in the window title 14. By Sam selecting and activating a name on his Directory 10 list such as "Mary" with a pointing device such as a mouse, cursor keys or the like, this will cause a typical "chat" window, FIG. 3, to open wherein the user, Sam, may then enter messages 20 as desired in the input area 16 viewable by the recipient "Mary" at her computer. Window title 18 indicates Mary is the individual with whom Sam is exchanging messages. Of course messages from the recipient Mary will, in like manner, be displayed in the input area 16 for Sam to view at his computer, with such messages being communicated between computers via an appropriate network. Although as just described Sam initiated the chat session by selecting Mary from his Directory, just as commonly some other user of the same IM application system may initiate the chat session even though that person is not listed in the local user's personal Directory.

These IM applications typically provide for simultaneously opening a plurality of such chat windows, FIG. 3, each for a different active conversation transpiring between the user, e.g. "Sam" in the example being discussed, and the respective selected ones of the various users 12 appearing in his Directory view pane 10 of FIG. 2. Each such chat window either may have been opened by the user initiating the chat by selection of a recipient from the Directory 10 or may have been opened automatically by an incoming message or invitation to chat from an individual appearing in the user's Directory or an individual not in the Directory but knowing the user's chat address.

Such IM applications have improved and evolved over time as their popularity has increased by the addition of several additional useful features. For example, some IM applications permit the user to custom configure their interactive capabilities so as to provide indicators (audible, tactile or visual indicators such as blinking windows and the like) alerting the user to an incoming newly arrived message.

Still further, these applications may also provide the ability to reduce their disruptive nature caused by their default "pop-up" behavior (wherein, after receipt of a message, the chat window, FIG. 3, pops up on the desktop on top of all other applications currently invoked by the user). It will be appreciated that this can be very annoying and adverse to productivity. Thus, some IM applications provide for a user modification wherein the chat window will "pop-down" below the other extant applications, nevertheless still providing the alert to the user of the receipt of the new message. In this manner, the application which was in focus and being employed by the user, such as a word processing application, remains so and is not disrupted by the incoming message.

While these enhancements have greatly improved the overall utility of IM applications, several severe drawbacks nevertheless remain which have continued to plague users. One such serious drawback has ironically been exacerbated by the "improvement" in providing for the customized pop-down feature as hereinbefore described. With the advent of multitasking and windowing computers, it is commonplace for a user to have multiple windows and computer activities transpiring at the same time on the desktop. For example, a user may have a word processor application, a spreadsheet, and several chat windows, FIG. 3, opened contemporaneously. When a new message from an IM application is incoming, by not invoking the "pop-down" feature, the user can certainly focus upon this most recent message as it pops up onto the top of the desktop. But this provides the attendant disruption sought to be avoided by customizing the most recent message to manifest itself in a pop-down window. However, when the IM application is so configured to avoid the aforesaid disruption by invoking the pop-down feature, this in itself presents difficulties. When it is desired to focus on this most recently received message in order to formulate a response, it becomes problematical, as will be seen, to locate the relevant chat window associated with this most recent message amidst and buried below the plurality of all concurrently opened windows on the desktop.

Modern operating systems upon which such IM applications execute typically provide means for navigating between multiple applications and associated opened windows. For example, the familiar Alt-tab keyboard sequence in the Windows(®) operating systems available from the Microsoft Corporation steps the user sequentially through all of the opened windows on the desktop. The user may thereby navigate sequentially window by window through each such window utilizing repetitive Alt-tab key sequences. By doing so each such window is sequentially brought to the top of the desktop for viewing until the user arrives at the desired chat session and associated chat window wherein the most recently received message is displayed.

This however is highly undesirable for several reasons. First the sequence in which the opened windows are traversed includes the entirety of all opened windows, not just chat windows, adding to the time necessary to respond to an incoming message while the user traverses all such windows to locate the appropriate chat window. Furthermore, the sequence of windows traversed in this manner is not user-definable but rather dictated by the operating system. Moreover, for individuals needing to employ assistive technology, such as unsighted users, such toggling through windows becomes annoying, particularly with several ongoing conversations. An audible indication must be provided for each window that is sequenced through to enable the user to select the chat window associated with the most recently received message—adding to the annoyance, confusion, and decrease in productivity.

Yet an additional problem with state-of-the-art IM systems is the inability to provide the user with an intelligent, user-defined sequence in which active chat sessions are to be selected and engaged in. Prior to the subject invention, the user had no recourse other than to laboriously step through the sequence of active open chat windows in a set order defined by the particular operating system with no particulars as to each conversation or user. There was no provision for detailing parameters associated with individuals with whom the user communicates to assist in the intelligent selection of which particular communicant the user will exchange messages with next.

What is needed, therefore is an improved system and method for use in instant messaging which could overcome all the aforesaid problems including the difficulties in locating a desired active chat session for further interaction. An improved system was further needed to better facilitate intelligent management and prioritizing of active chat windows and sessions. Additionally, a method was needed for overcoming the disruptive nature of incoming active chat window pop-ups, and for assisting the user in better prioritizing and selecting active chat sessions.

SUMMARY OF THE INVENTION

The present invention provides a system and method for user-defined control of the operation and appearance of a computerized instant messaging service and associated user interface. Improved control over presentation of and ease of access to instant messaging services, particularly for unsighted and other users requiring assistive technologies, is facilitated. In a preferred embodiment, a computerized instant messaging (IM) application is provided having a displayable active sessions list (ASL) comprised of identifiers; such as names or the like, of all communicants involved in current active chat sessions with the user. The list is preferably invoked by the user and brought to the top of the desktop as desired by a predefined first hot key whereby it is automatically focused. In one embodiment, the list is ordered, preferably with the identifier appearing at the top of the ASL which is associated with the communicant of the most recent incoming IM chat message which is still unresponded to by the user. By the user then activating a predefined second hot key, a chat window associated with this communicant may then be opened and focused for receipt of a responsive message from the user. The ASL is scrollable whereby any other communicant appearing on the list and thereby associated with an active chat session with the user may be selected by the user as desired and, with the second hot key, a chat window opened associated with this other communicant. Each time a newly received incoming chat message occurs, the ASL automatically is updated with the identifier for the associated communicant appearing at the top of the ASL. Additionally an indicator, such as a visual cue on the IM user interface or an audible or tactile cue for the unsighted user or other user in need of assistive technology, occurs upon the receipt of the most recent chat message thereby alerting the user to again invoke the ASL with the first hot key to ascertain who the incoming message is from and to respond as desired.

In a preferred embodiment, the IM application further includes a user-selectable property to preclude, as desired, chat windows associated with most recently incoming chat messages from automatically popping up to the top of the desktop, thereby avoiding the disruptive effect thereof. The identifier for each communicant in the ASL may additionally or in the alternative to the name of the communicant include one or more additional parameters helpful to a user in a decision of whether and when to communicate further with a given communicant. Such additional parameters may include a work group name or other identifier associated with the communicant, a sub-organization of the identifiers and associated communicants by time zone they reside in, how long they have been active in a chat mode session, whether they are still logged on to the IM service, time which has transpired since receipt of their last message, and the like. Additionally, it is a feature of the invention to provide for user-selectable algorithmic support as desired for the ordering of the identifiers as they appear in the ASL. In one embodiment, the algorithm is time based, wherein the identifier associated with the most recent non-responded to chat message occurs at the top of the ASL, followed by the next most recent such non-responded to message and so on, and wherein upon responding to a chat message, the associated identifier is automatically placed at the bottom of the ASL, progressing up the list as messages on the top of the ASL are responded to and their identifiers, in like manner, placed at the bottom of the ASL. The invention admits to any schema for ordering the identifiers as desired and represented by an algorithm executing with the IM application of the present invention. It is further contemplated that such algorithmic ordering of the ASL may be implemented by a user-selected algorithm plug-in or other manner in which the user may wish to intelligently alter the ordering of the identifiers in the ASL as desired.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, details concerning network communications, conventional computer system design and operation, and the like, have been omitted inasmuch as such details are not considered necessary to obtain a complete understanding of the present invention, and are considered to be within the understanding of persons of ordinary skill in the relevant art.

Figure 1:
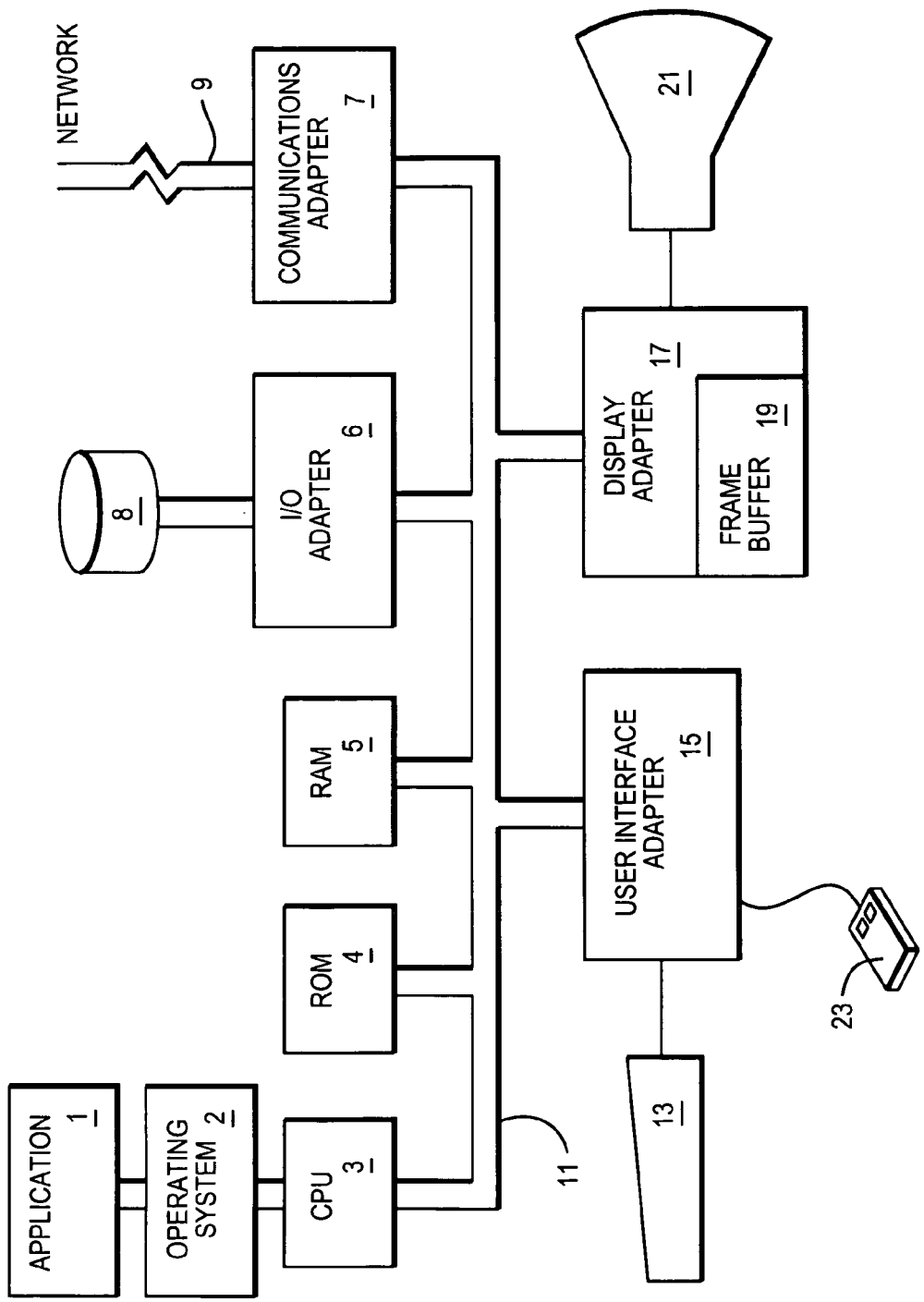
FIG. 1 is a functional block diagram of a representative computer chat system of the invention employable by a user and chat communicant, including a network linking the two.
Figure 2:
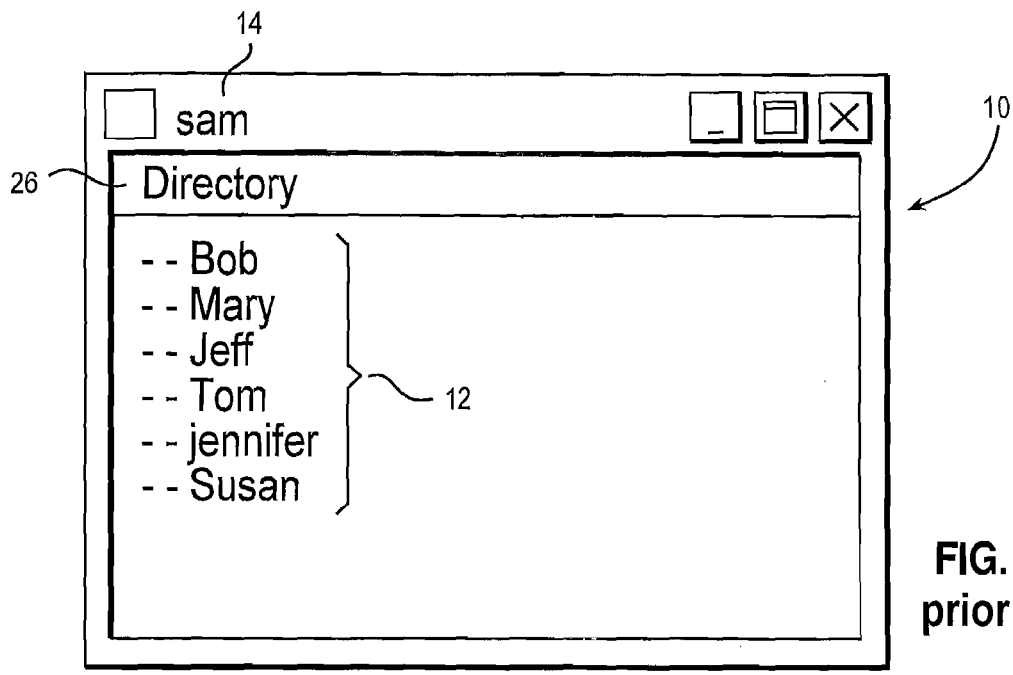
FIGS. 2 and 4 are screen shots depicting chat directories occurring during a representative operation of the invention.

Referring now to FIG. 1, a typical general purpose computer is shown which may function as the terminal or "client" PC employed by the user for instant messaging in accordance with the invention. Such suitable computers are available from IBM, the Dell Corporation, and a variety of other manufacturers. In such a computer, typically a central processing unit (CPU) 3, such as a PC microprocessor in a number of PCs, servers or workstations available from International Business Machines Corporation (IBM) or the Intel Corporation, for example, is provided and interconnected to various other components by system bus 11. An operating system 2 runs on CPU 3, provides control and is used to coordinate the functions of the various components of FIG. 1. Operating system 2 may be one of the commercially available operating systems such as Microsoft's Windows XP™, UNIX, or AIX operating systems from IBM. An application program 1 that includes routines of the present invention for instant messaging to be subsequently described in detail, runs in conjunction with the operating system 2, and provides output calls to the operating system 2, which, in turn, implements the various functions to be performed by the application 1. A Read Only Memory (ROM) 4 is connected to CPU 3 via bus 11 and includes the Basic Input/Output System (BIOS) that controls the basic computer functions. Random Access Memory (RAM) 5, I/O adapter 6, and communications adapter 7 are also interconnected to system bus 11. It should be noted that software components, including operating system 2 and application 1, are loaded into RAM 5 which is the computer system's main memory. I/O adapter 6 may be a Small Computer System Interface (SCSI) adapter that communicates with the disk storage device 8, such as a hard drive. Communications adapter 7 interconnects bus 11 with an outside network linkage 9 enabling the computer system to communicate with other such systems over a network including the Internet or Web, intranet or the like. It will be readily appreciated that at the opposing end of the network linkage 9 another computer system (not shown) similar to that hereinbefore described and depicted in FIG. 1 will be provided for the communicant with whom a user of the system of FIG. 1 wishes to communicate in accordance with the instant messaging system and method of the present invention.

Figure 3:
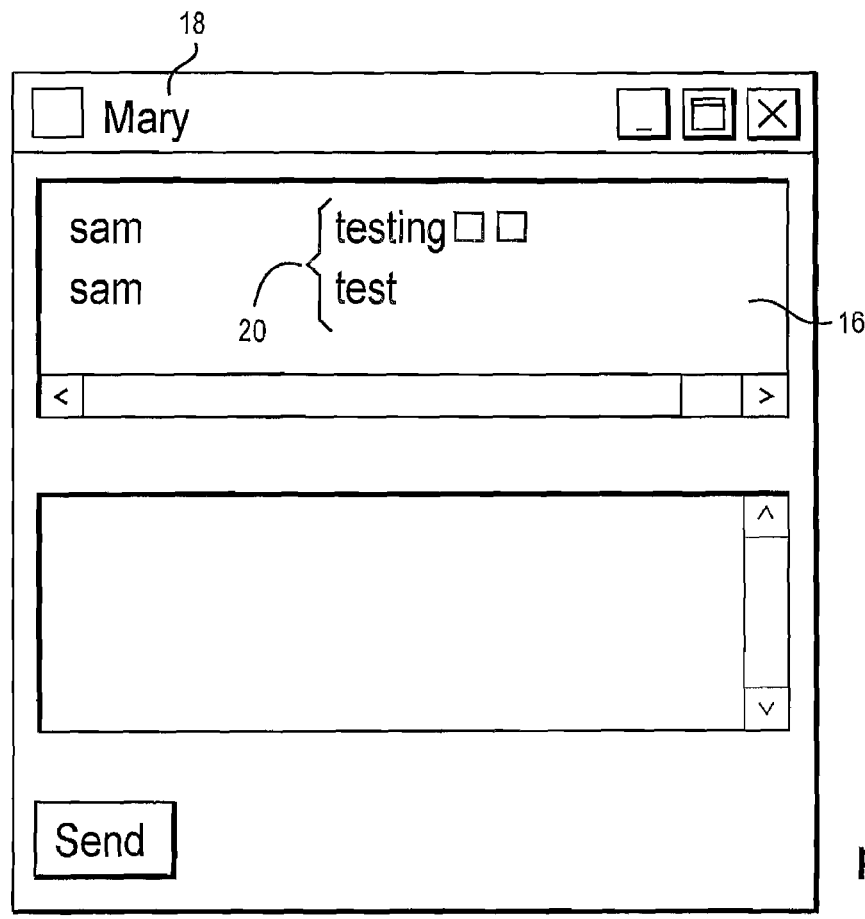
FIGS. 3, 5, 8-9, and 11-12 are screen shots depicting chat windows occurring during a representative operation of the invention.
Figure 4:
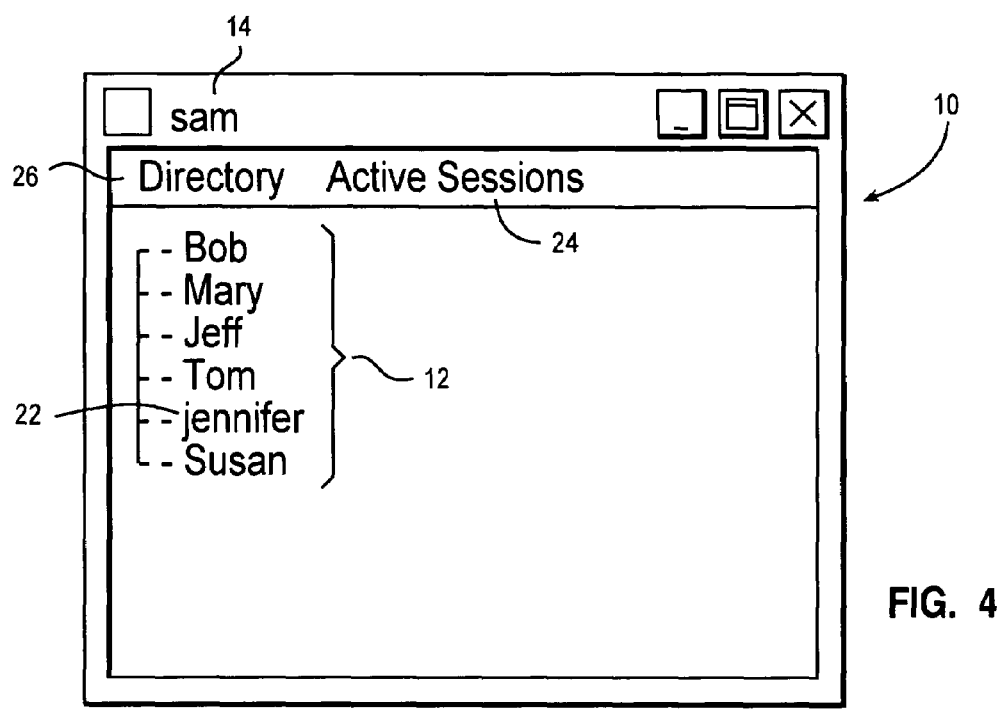
Figure 5:
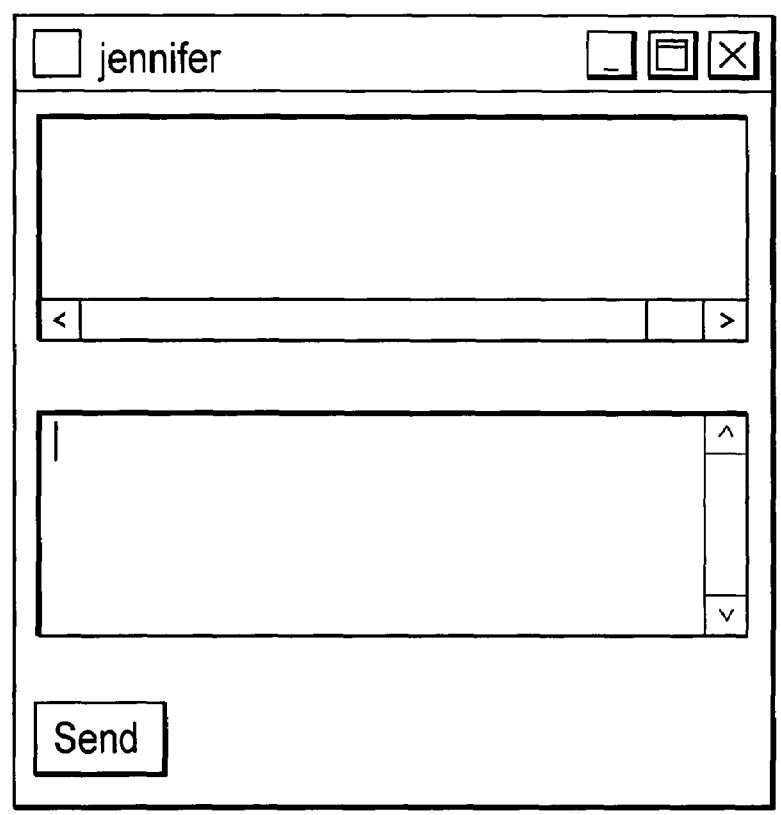
Figure 6:
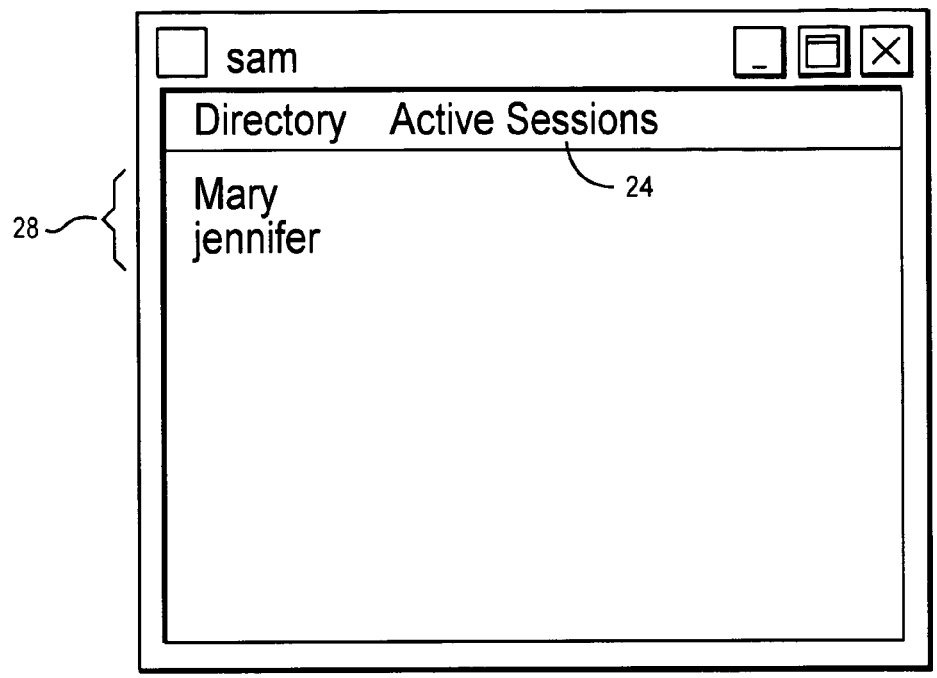
FIGS. 6-7, 10 and 13 are screen shots depicting active session lists (ASL) occurring during a representative operation of the invention.

Referring now to FIG. 4 the chat directory view pane is shown again, this time with "Jennifer" highlighted, 22, signifying that the user desires to now engage Jennifer in a chat session. Accordingly, in like manner to the case with Mary's chat window, FIG. 3, a chat window for Jennifer is opened, FIG. 5. Referring back again to the directory view pane of FIG. 4, a novel feature of the invention may be seen depicted therein. Specifically an "Active Sessions" tab 24 is included in addition to a "Directory" tab 26. When the Directory tab of a Directory, FIG. 4 is activated (indicated in some appropriate manner such as highlighting well know in the art) the list of names of available participants for chatting appears, including "Jennifer" and "Mary". However the novel addition to such Directory windows is the "Active Sessions" tab 24. When this tab is activated, with such activation again being signified by highlighting or the like, an active chat session list view pane, FIG. 6, is caused to be displayed. This view pane will display the names of all currently active chat participants who have active, open chat sessions with the user- in the present example "Mary" and "Jennifer" as shown at 28, comprising the Active Session List (ASL).

Figure 7:
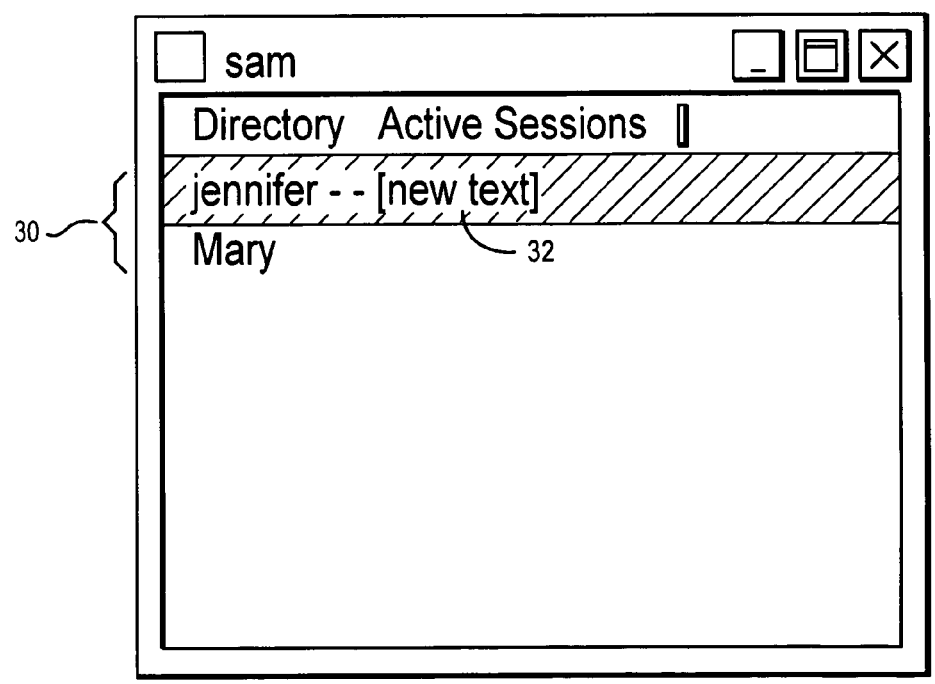

Referring now to FIG. 7, if we were to assume now that Jennifer has sent the user a chat message (which may have been precipitated by the user selecting Jennifer from the user directory so as to advise her that the user is now available in an active chat mode), several things will be noted in accordance with the subject invention. First, a comparison of the names 28 and 30 in FIGS. 6 and 7, respectively, corresponding to before and after Jennifer has sent her message, will reveal that in FIG. 7 "Jennifer" now appears at the top of the list. This signifies that she is associated with the most recent message received but not yet responded to by the user. Secondly, this topmost name has now been preselected over "Mary" as shown by the highlighting in FIG. 7 on the assumption that the most recently received message is the one the user is most likely to desire to respond to first. Accordingly, to do so the user need only activate a predefined first activation or "hot" key (typically the "Enter" key) to bring a chat window for Jennifer (such as that in FIG. 5) to the foreground in order for the user to enter a desired message for Jennifer. Thirdly, a close inspection of the names 30 in FIG. 7 will reveal the addition of the phrase "[new text]", 32, beside Jennifer's name. This indicates that new message or chat text 34 (in the example under consideration, the word "test") has appeared for, reading by the user in the text message area 36 of Jennifer's chat window of FIG. 8.

Figure 8:
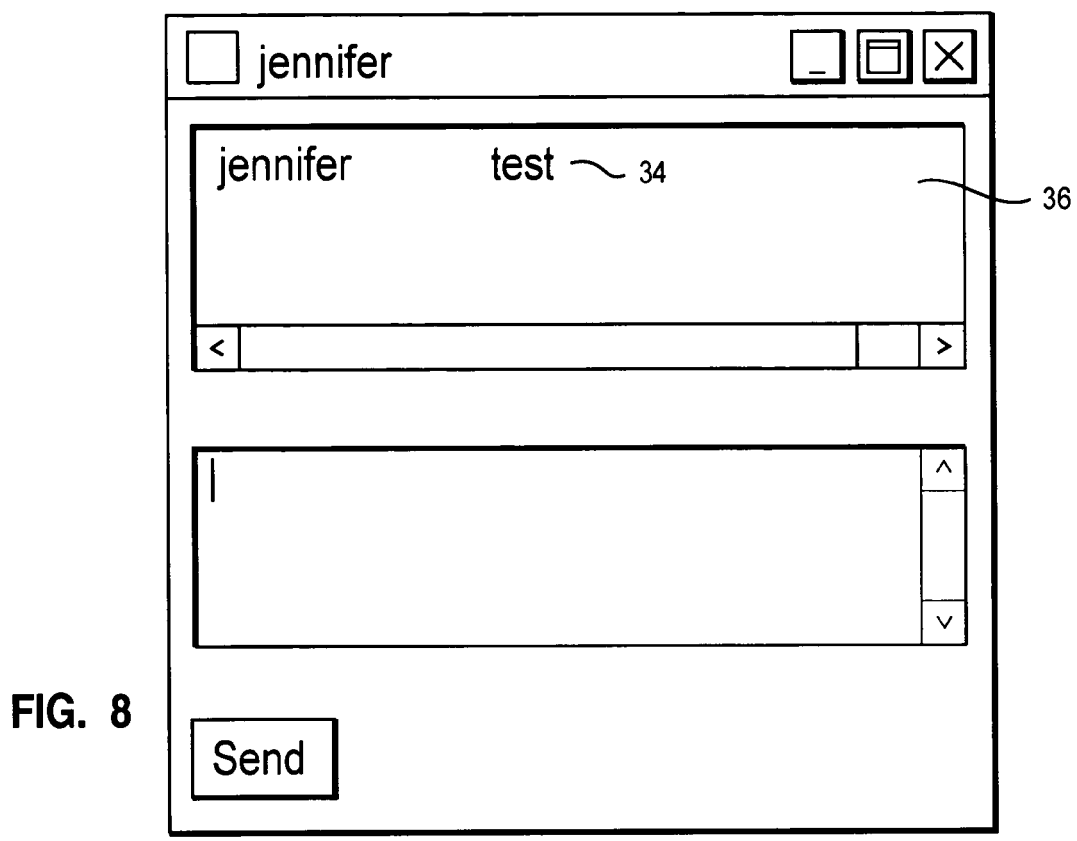
Figure 9:
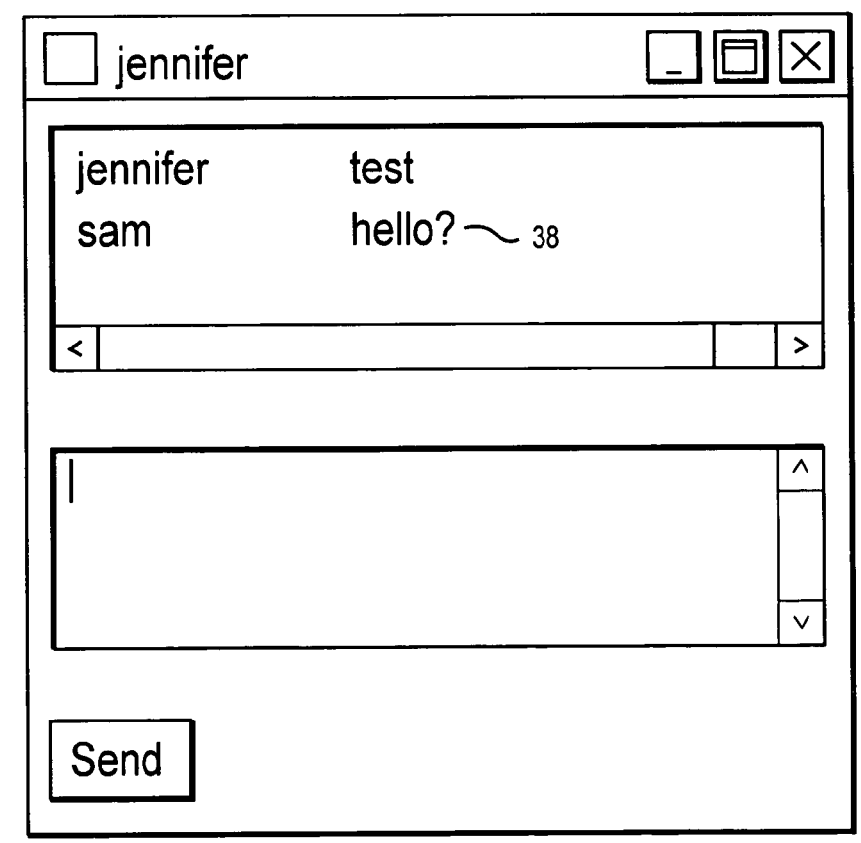

Continuing with the example, assuming the user wishes to respond to Jennifer's "test" message, he or she may do so by entering an appropriate chat response 38 such as "hello?" in Jennifer's chat window, as shown in FIG. 9. At this point another important feature of the invention must be noted of particular importance when the system is being utilized by those in need of assistive technology and particularly the unsighted user. When a window of another application such as a word processor is opened and active, these hereinbefore described chat windows, such as depicted at FIGS. 3 and 8 are preferably hidden on the graphical user interface of the system and removed from the open window list of the particular operating system which the user is employing. This is important and significant for the following reason. If a user desires to commence chatting again with someone in an active chat session, the user need only open the operating system's active window list and select from it the active chat session directory window (such as shown in FIGS. 6 or 7) and select from it the desired chat partner with whom to resume the active chatting. In this manner, there will not be multiple chat windows open and appearing in the active window list which would otherwise necessitate the user tabbing through these multiple open windows with multiple keystrokes in order to navigate through the operating system open window list to arrive at the active chat session directory window from which to selected the desired chat window to resume messaging. While this may not appear at first thought to be significant, one may appreciate that with multiple application and chat windows open, the tremendous nuisance and unworkability, particularly for sightless users, in having to tab through each and every such opened window to arrive at a particular chat window of someone with whom the user desires to resume chatting—whether reading the most recent message received or responding to it.

Up until now the situation has been discussed wherein a chat partner such as Mary or Jennifer were preselected known partners appearing in the user's Directory view pane such as depicted in FIG. 4. But situations arise wherein it is desired to chat with a partner not appearing in such Directory. Such a potential chat partner may be sent an invitation by the user knowing the potential non-Directory partner's email or chat address or vice versa wherein such prospective partners sends an invitation to chat to a user by knowing the user's address, thereby inviting messaging between the user and such a non-Directory individual.

Figure 10:
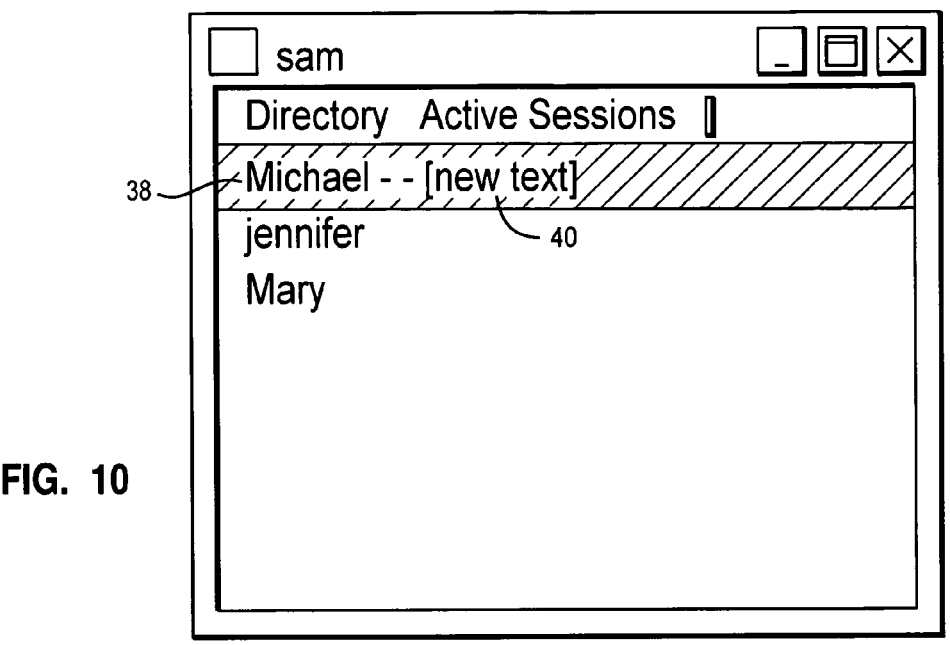

FIG. 10 represents just such a situation. Here an individual "Michael", 38, desires to chat with the user. Reference to the user's personal Directory, FIG. 4, reveals that "Michael" is not present in the Directory. When Michael sends a chat message to the user, his name, 38, may be seen to have been entered in the Active Chat Session Directory now in FIG. 10. Moreover, it will be noted that his name has been entered at the top of the Active Session List (ASL) of FIG. 10, signifying that his is the most recent unresponded-to message which has been received. Also, as in the case of the message from Jennifer, 30, in FIG. 7, it will be noted that a "[new text]" designation 40 appears next to Michael's name further indicating that a message has been received from him.

Figure 11:
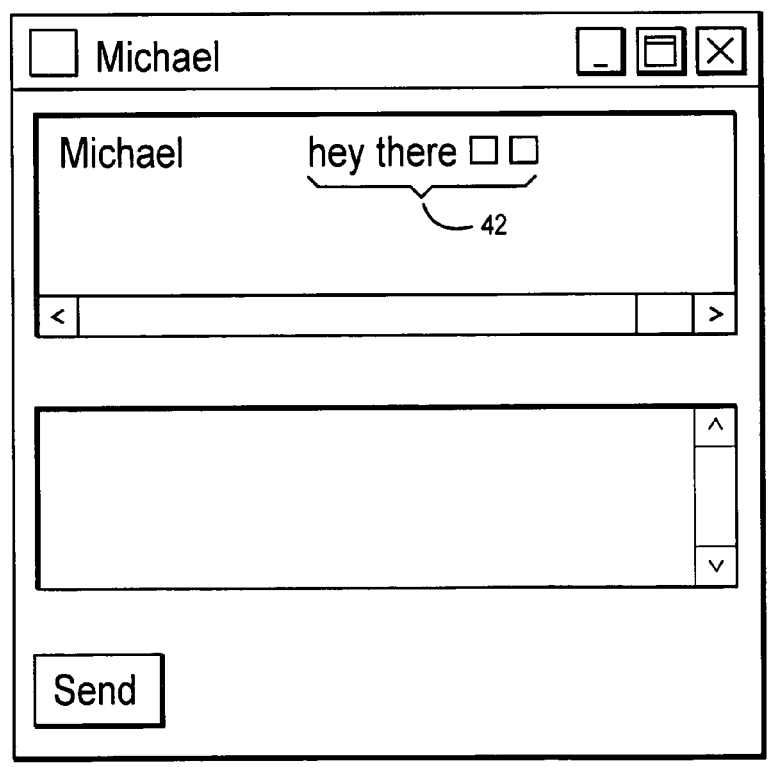
Figure 12:
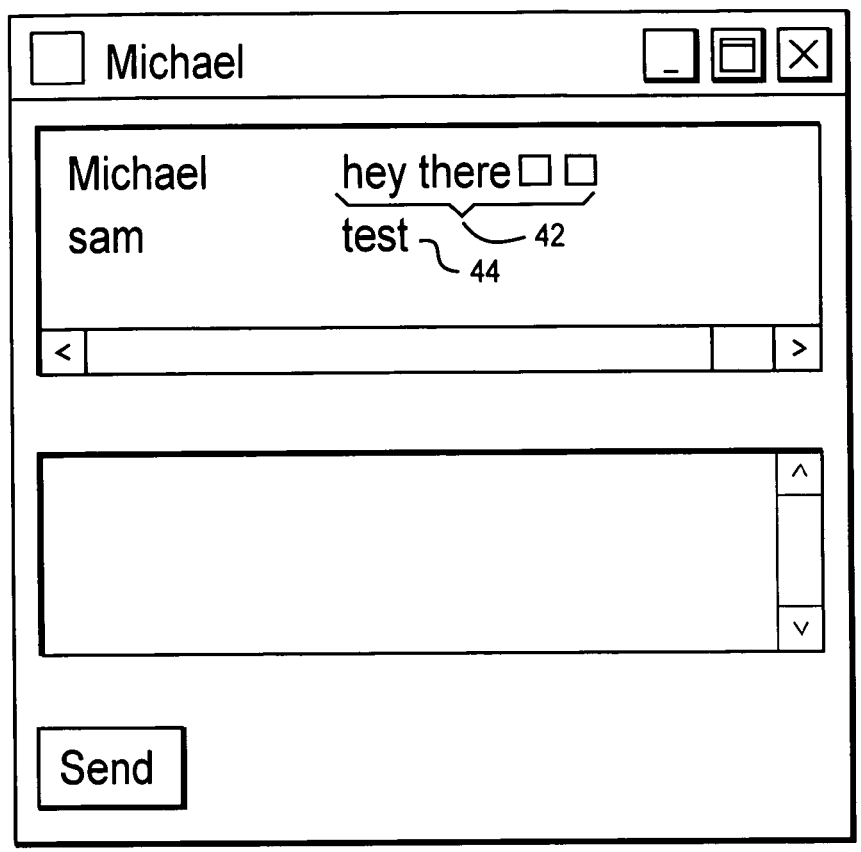
Figure 13:
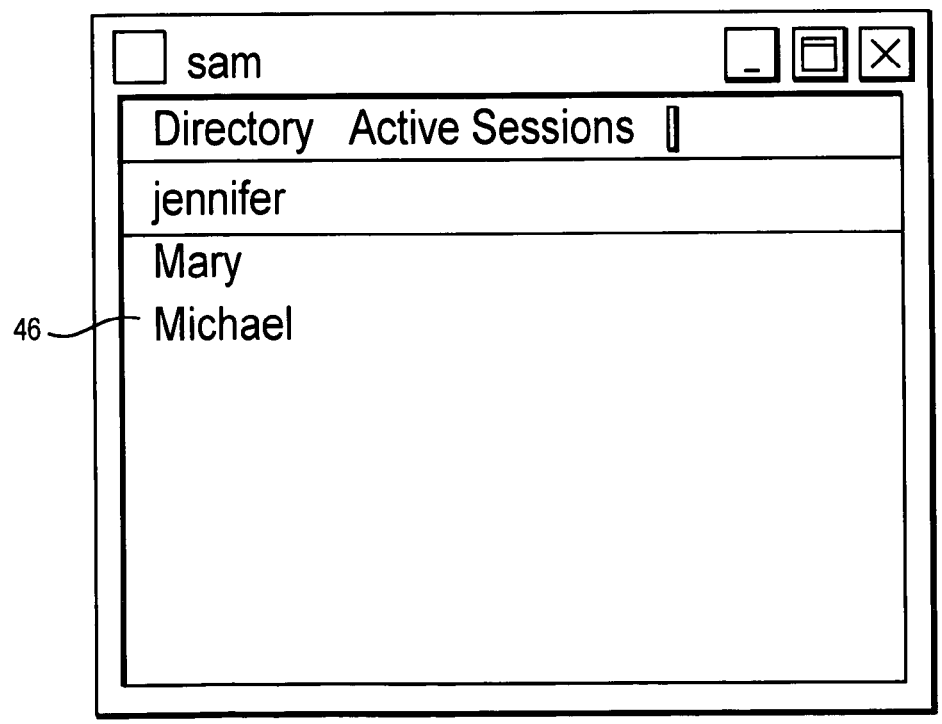

The user may then activate the associated chat window, FIG. 11, for messaging between Michael and the user by depressing the "Enter" key to surface the chat window, FIG. 11, for Michael, wherein the text of the new message ("hey there") from him appears at 42. This messaging will thus be enabled with Michael notwithstanding that he is not in the Directory of preselected chat partners shown in FIG. 4. The user may then respond as desired, as shown in the response "test", 44, from user Sam, FIG. 12. It will be noted that in the active chat sessions Directory list ASL, FIG. 13, that after the user has responded to Michael with the "test" response, the ASL indicates that "Michael"'s name, 46, remains in the Active Sessions list of FIG. 13, but has now dropped to the bottom of the name list. A comparison to the Active Sessions list of FIG. 10 wherein "Michael" appears at the top will thus confirm that the name at the top of the list corresponds to the most active unresponded-to communicant. Thus after the user responded to Michael's message, Michael's name drops down in the ASL list as shown in FIG. 13. Thus the name at the bottom of the ASL will preferably always indicate the most recently responded to message, whereas the name at the top of the list will correspond to the communicant with the most recent unresponded to message.

Thus in summary, an important feature of the invention is the novel introduction of an Active Sessions List aspect to the Directory, the "ASL", which lists the names of only the active communicants with the user. This will typically be a subset of the total number of prospective communicants in the user's Directory and may, as shown in the above example, also include communicants not appearing in the Directory. Yet an additional important feature of the invention is the automated ordering of the names appearing in the Active Sessions List, wherein the topmost name, in a preferred embodiment, is that of the communicant providing the latest message unresponded-to by the user, and the lowest most name being that of the communicant with whom the user has provided the most recent response.

In a preferred embodiment, when a window other than the current active chat session window is selected, to continue helping to minimize the effort to locate any chat session, the current active chat session window will be preferably minimized and removed from the main operating system's window list. This will preferably occur every time, so that the user is always presented with the same access approach, e.g. wherein the ASL is located by using the operating system-provided window sequence (such as Alt-Tab in the case of Microsoft's Windows operating systems for example), the ASL is surfaced, a desired user is located, and a hot-key depressed to activate that particular session window. This may appear counter-productive if one needs to obtain some information for that particular user from another running application. However, for users with many applications or chat sessions opened, or for users with assistive technology tool aids, the reduction in wasted keystrokes and this consistent approach are far easier to deal with.

While in the embodiment depicted, the ordering of the names is as indicated, the invention is not intended to be limited to this particular schema of ordering. Rather, the invention admits to a more general notion of providing several other criteria as desired for ordering the names in the ASL, and for such other criteria, in another embodiment, to be user-selectable.

Turning now to FIGS. 14A-14D, depicted therein is a series of flow diagram for a representative IM chat software application executing as application 1 on the computer system of FIG. 1 in accordance with the teachings of the present invention. A similar such application will be executing on a communicant's computer system (not shown but similar to that of the system in FIG. 1) interconnected to the system of FIG. 1 via the network 9 shown in FIG. 1. When executing, the application 1, in conjunction with the rest of the components of the computer systems and input from the user and communicant, will cause the various sequences of steps and associated IM user interface screens to transpire in the manner of the invention throughout the course of a chat session as hereinbefore described with reference to FIGS. 2-13. It should be readily apparent to the routineer that appropriate software may be coded in a variety of manners and computer languages such as C++ and the like to effectuate the steps of the flow diagrams of FIGS. 14A-14D to execute on a variety of different computer systems without departing from the spirit and scope of the subject invention. Accordingly the invention is not limited by any particular implementation thereof, but rather admits to a variety of such applications.

Figure 14A:
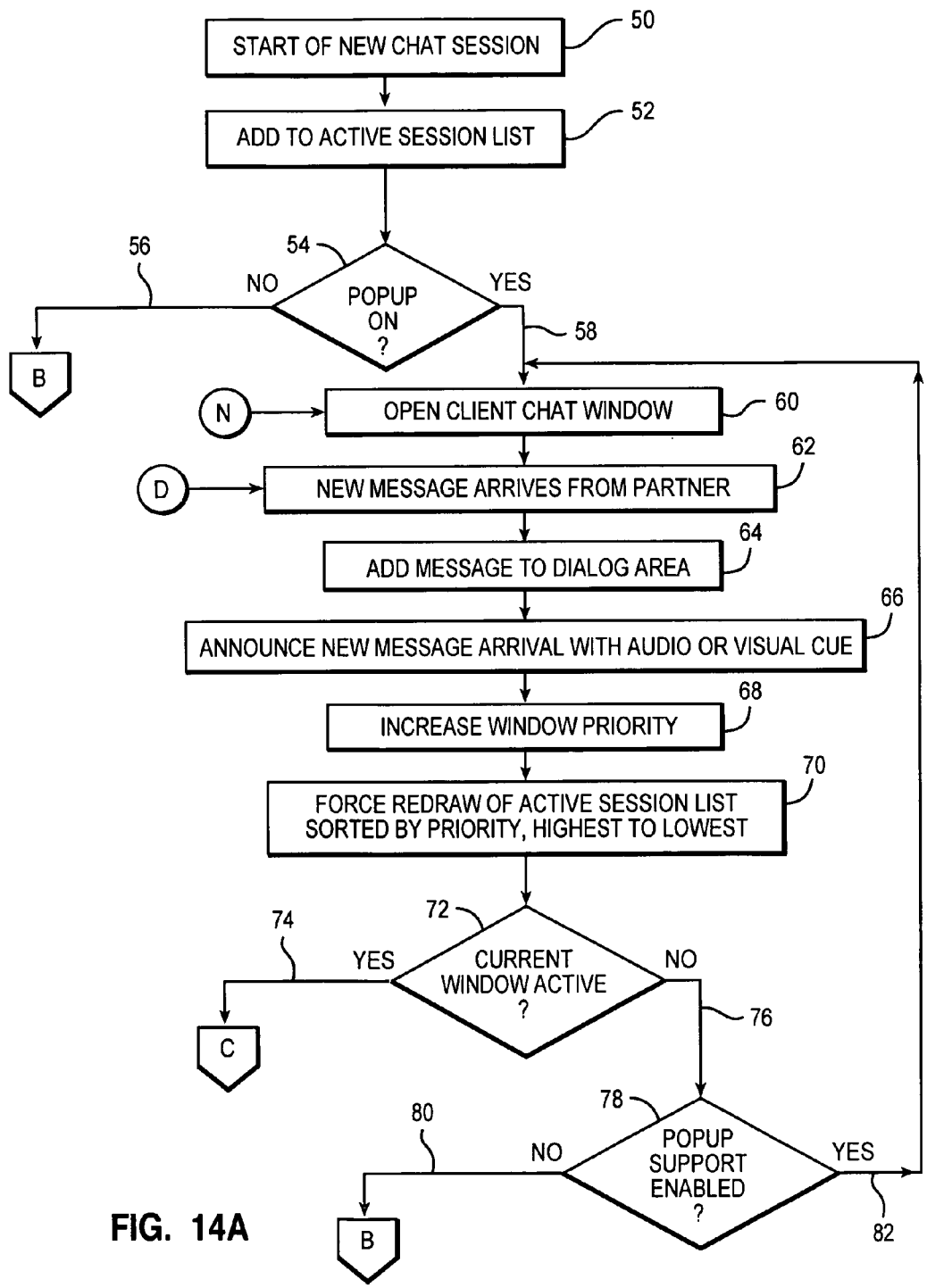
FIGS. 14A-14D are flow diagrams illustrating the sequence of operation of the invention under software control.
Figure 14B:
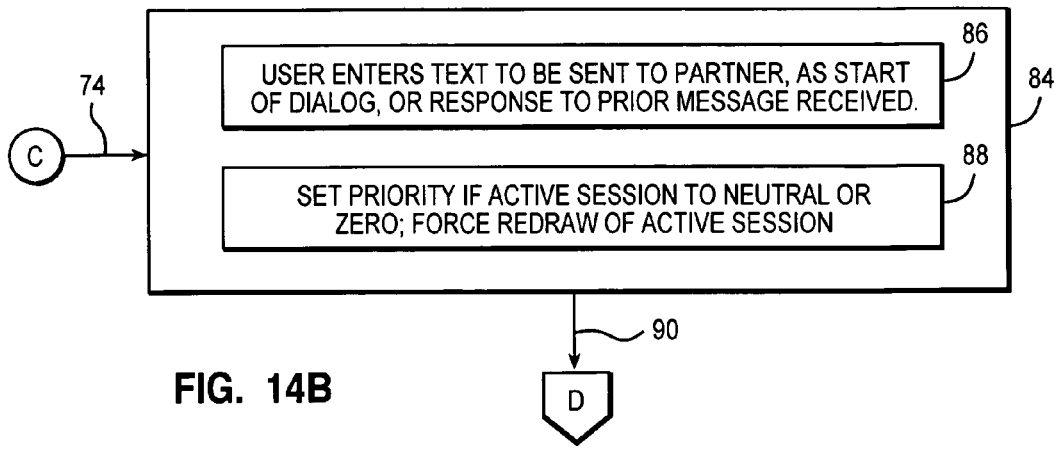

Still referring to the flow diagrams of FIGS. 14A-14D, the flow of events will further be described with reference to FIG. 15, which is a functional block diagram of components in the system of FIG. 1 implementing the IM chatting system of the invention. Such components may be implemented, as desired, in hardware, firmware, software, or any combination thereof. At the beginning of the process of the invention, a new chat session commences, 50 (FIG. 14A). This is initiated either by the user or a message 116 (FIG. 15) incoming to the system of FIG. 1, this fact being conveyed to the incoming message manager 104 (FIG. 15) and thence to the chat manager 102 via signal 120. The chat manager 102, by querying with signal 124 an active session list manager 108 will determine in response to message 126 therefrom whether the communicant's identifier is on the active session list (ASL), such as those shown in FIGS. 6, 7, 10 and 13, and if not to add the identifier to the list, shown at step 52 of FIG. 14A. Next, the system of FIG. 1 including chat manager 102, FIG. 15, will determine if the user has previously configured the system so as to defeat the window pop-up feature which, it will be recalled, causes an incoming message to appear on top of the desktop. It will further be recalled that this feature can become disruptive, annoying, and impede productivity, and accordingly it is frequently the case that the system will determine that the user has turned off this pop-up feature, show by the exit path 56 from decision box 54.

Figure 14C:
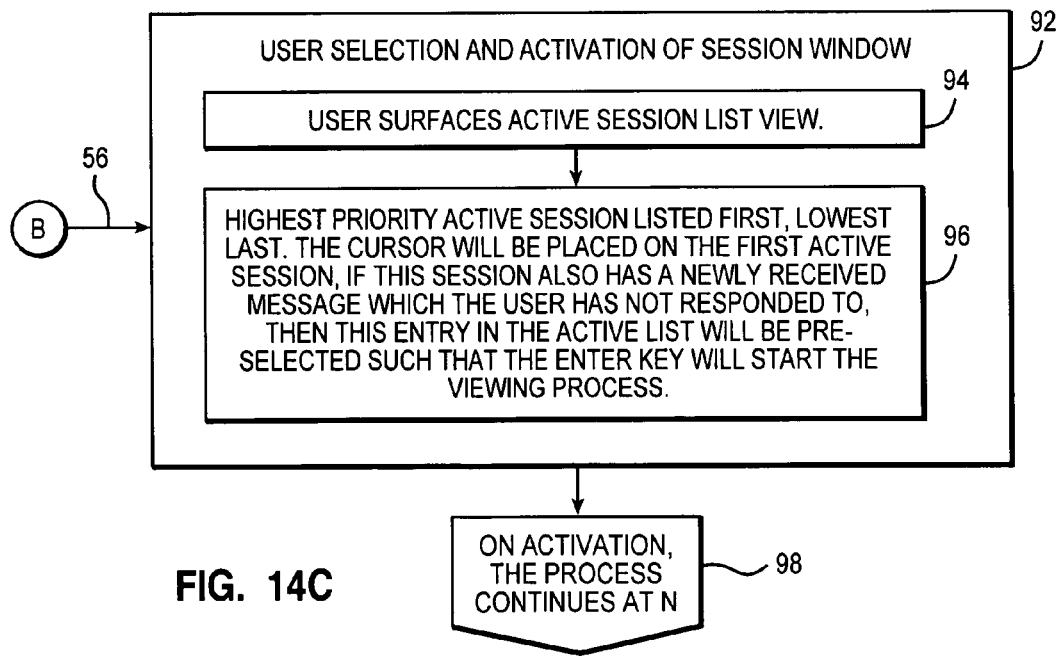
Figure 14D:
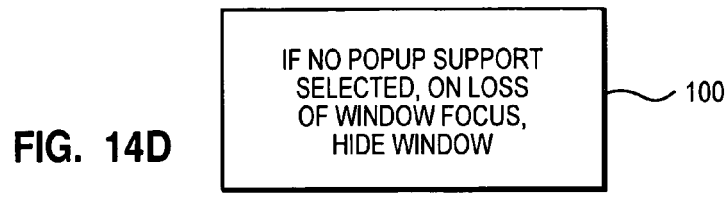
Figure 15:
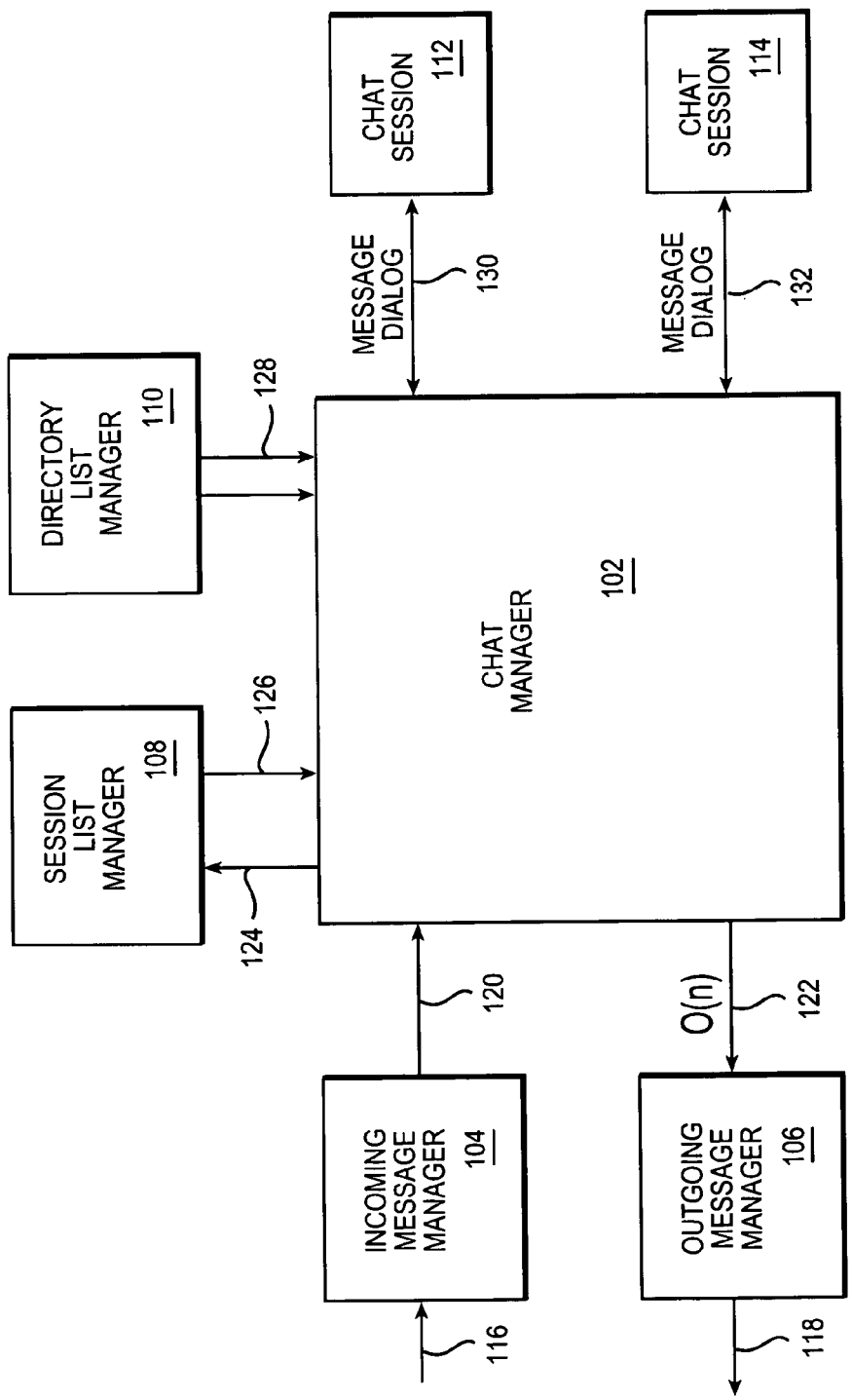
FIG. 15 is a more detailed functional block diagram of portions of the system of FIG. 1.

If the pop-up feature is "off", execution continues of the steps interacting with the user selection and activation of session window, 92, as shown in FIG. 14C. In this instance, with a deactivated pop-op, the user may manually surface a novel active session list view, step 94, such as that shown in FIG. 6 or 10, generated by the active session list manager 108 as a result of intercommunication between the ASL manager 108 and chat manager 102, shown by the bi-directional communication paths 124, 126. As shown in these figures and as may be recalled, the highest priority active session will preferably be listed first, the lowest last. The cursor will be automatically placed on the first active session (Jennifer's or Michael's as shown in FIG. 7 or 10, respectively). If this session also has a newly received message which the user has not responded to, then this entry in the ASL will also be preselected such that depressing a hot key, such as the "Enter" key, will start the viewing process of the associated chat dialog (such as shown in FIG. 8, for example). These events may be seen summarized in block 96, FIG. 14C. Upon execution of these steps by the system of FIG. 1 including the aforesaid activation of the desired most recent chat session window, the process continues, 98, at "N" of FIG. 14A.

Continuing at FIG. 14A, upon determining that the pop-up feature is on or after a return "N" from the routine just described with reference to FIG. 14C, the chat window is then opened, at step 60, such as shown in FIG. 3 and FIG. 8 in the case of chats with Mary and Jennifer, respectively, thereby initiating Mary's chat session, 112 of FIG. 15, and Jennifer's chat session 114 of FIG. 15. The system awaits detection of new messages arriving from a chat partner, 62, such as the "test" message 34 of FIG. 8 from Jennifer, shown in FIG. 8, in which case the message is added to the dialog area of the appropriate chat message window, 64 in FIG. 14A Such a message also may be seen as the "hello ?" message 38 of Sam in the Jennifer chat window of FIG. 9. Message interchanges or dialogues 130 and/or 132, corresponding to chat sessions such as the ones with Mary, FIG. 3 (reference numeral 112 in FIG. 15) and Jennifer, FIG. 9 (reference numeral 114 in FIG. 15) will then transpire, managed for display by the chat manager 102, in response to incoming messages 116 through incoming message manager 104 delivered as 120 to chat manager 102 and outgoing messages 118 from outgoing message manager 106 delivered from chat manager 102 on 122 to manager 106. It will be noted in passing that these incoming messages 116 derive from a communicant's system such as that of the user's depicted in FIG. 1, incoming over network 9 to the user system of FIG. 1. In like manner, these outgoing messages 118 from the user will be delivered through his or her system of FIG. 1 to the network 9 and thereafter conveyed to the appropriate communicant utilizing relevant well-known communication protocols such as TCP/IP in the case of an internet network link providing the IM chat functionality and interconnections.

It will be recalled that the present invention is of particular use in instances wherein a user is in need of assistive technology ("AT"), such as in the case of the unsighted user. Accordingly, preferably each time a new message arrives, the user is alerted to this with the aid of a cue, 66 such as an audio cue (through a speaker or headphones connected to an appropriate sound generating device with associated audio adapter feature, not shown in FIG. 1 but well known in the art). Alternatively, such cue may be provided by a tactile vibration alert or by means of a visual cue appearing on display 21. When the new message has occurred, the window priority of the window in which it is displayed is increased, 68, and a redraw of the ASL is forced, 70, by the ASL manager 108, such as in FIG. 10 wherein the redrawing shows "Michael" at the top of the list. The ASL manager, in accordance with an important feature of the invention, will execute an ordering algorithm to sort this list in accordance with a preselected, user-configurable routine such as a sort appearing in the list by priority, highest to lowest. One criteria for the sort is having the communicant of the most recently received message as yet unresponded-to by the user appearing at the top. However it will be readily apparent that the ordering of the communicants appearing on the ASL may be in accordance with a different selectable algorithm and associated other criteria as desired, such as ordering alphabetically by user name, by originator's time zone, by work group name or identifier and the like as desired.

Continuing with FIG. 14A, the process will then determine if the current window is active, 72, and if so exits at 74 to subroutine 84 by path "C" shown in FIG. 14B. At this point the system enables the user to enter text to be sent to a chat partner as the start of a dialog or a response to a message previously received, 86. A priority is set if a session is active to neutral or zero and a redraw of the active session list again is forced, 88, whereupon the subroutine exits, 90, along path "D" to await detection of a new message arriving from a chat partner, 62 of FIG. 14A. If, at decision tree 72, it is determined by the system that the current window is not active, execution proceeds along path 76 to a determination, 78, whether pop-up support is enabled. If "yes", the process continues at block 60 wherein a client chat window is opened. If "no", the decision tree at 78 exits on path 80 to execute the subroutine "B" hereinbefore described with reference to FIG. 14C.

While the invention has been described in the context of instant messaging and has particular benefit for those in need of assistive technologies, it should be readily appreciated that it is not intended to be so limited and has wide applicability to other uses. For example, the windows comprising the ASL have been described as being associated with instant messaging and the ASL comprises a subset of all windows appearing in a windows list of an operating system.

It was described how unworkable it was to toggle through (typically with the Alt-tab key sequence) all such windows appearing in a general windows list conventionally provided by a windowing operating system to arrive at those desired to be interacted with. Thus, although instant messaging windows have been culled out of this general windows list for special treatment in the ASL, such subset of windows needn't be limited to only those having to do with instant messaging. Thus, the invention admits to other differing unifying characteristics as desired of the subset of windows appearing in the ASL culled from the general windows list, such as those only dealing with graphics applications. In this manner, a user could more easily toggle through this list of only graphics-related windows and associated applications appearing in such an ASL without having to toggle through all of the windows appearing in the general windows list of the operating system.

It is understood that the present invention can take many forms and embodiments. Accordingly, several variations of the present design may be made without departing from the scope of the invention. The capabilities outlined herein allow for the possibility of a variety of programming models. This disclosure should not be read as preferring any particular programming model, but is instead directed to the underlying concepts on which these programming models can be built.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of preferred embodiments. Accordingly, it is appropriate that the appended claims be construed broadly and in a manner consistent with the scope of the invention.

What is claimed is:

1. A method for managing instant messaging carried out on a computer system connected to a communications network, comprising:

establishing a plurality of real-time chat sessions with communicants connected to the network;

opening a plurality of chat windows for the respective chat sessions;

generating an active chat sessions list (ASL) containing all of the chat sessions, including identifiers for the communicants; and displaying said ASL on a display device of the computer system with said identifiers placed in order based on a time which has transpired since receipt of a non-responded to a chat message, wherein a given one of the identifiers with the most recent non-responded to chat message is placed at the top of the ASL in order; and when a response is sent to the communicant associated with the given identifier then it is automatically placed at the bottom of the ASL.

2. The method of claim 1 wherein said ASL includes entries for each message from the communicants in accordance with criteria selected by a user of the computer system.

3. The method of claim 2 wherein said criteria is time of receipt of each said message not responded-to by said user.

4. The method of claim 1 wherein said instant messaging includes a chat window pop-up upon receipt of said each message, and wherein said method further comprises user-selectable disabling of said chat window pop-up.

5. The method of claim 4 wherein said displaying of said ASL is responsive to a first hot-key.

6. The method of claim 5 wherein one of the chat windows is displayable responsive to a second hot-key; and wherein the method further comprises:

detecting when a non-currently active chat session window is selected;

minimizing a currently active chat session window in response to said detecting;

removing said currently active chat session window from an operating system window list;

locating said ASL using a key sequence defined by said operating system window list;

displaying said ASL on top of any other displayed windows on the display device;

locating a desired communicant in said ASL; and activating a hot-key to activate a chat session corresponding to said desired communicant.

* * * * *

UNITED STATES PATENT AND TRADEMARK OFFICE
CERTIFICATE OF CORRECTION

PATENT NO. : 7,617,283 B2 Page 1 of 1
APPLICATION NO. : 11/032245
DATED : November 10, 2009
INVENTOR(S) : Aaron et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1281 days.

Signed and Sealed this

Nineteenth Day of October, 2010

David J. Kappos
*Director of the United States Patent and Trademark Office*